US012611907B1

(12) United States Patent
Campbell et al.

(10) Patent No.: US 12,611,907 B1
(45) Date of Patent: Apr. 28, 2026

(54) VEHICLE LIFT SPACER APPARATUS

(71) Applicant: Car Sound Exhaust System, Inc.,
Oceanside, CA (US)

(72) Inventors: Jason Scott Campbell, Costa Mesa,
CA (US); Jerry Nathan Zaiden,
Newport Beach, CA (US)

(73) Assignee: Car Sound Exhaust System, Inc.,
Oceanside, CA (US)

( * ) Notice: Subject to any disclaimer, the term of this
patent is extended or adjusted under 35
U.S.C. 154(b) by 0 days.

(21) Appl. No.: 19/369,123

(22) Filed: Oct. 24, 2025

Related U.S. Application Data

(60) Provisional application No. 63/713,692, filed on Oct.
30, 2024.

(51) Int. Cl.
B60G 99/00 (2010.01)
(52) U.S. Cl.
CPC ........ B60G 99/002 (2013.01); B60G 2500/30
(2013.01)
(58) Field of Classification Search
CPC .......................... B60G 99/002; B60G 2500/30;
B60G 13/003; B60G 2204/1242; B60G
2204/128; B60G 2204/4402; B60G
15/062; B60G 15/063; B60G 2206/911;
B60G 2202/312; F16F 9/56; F16F 1/13
See application file for complete search history.

(56) References Cited

U.S. PATENT DOCUMENTS

| | | | | |
|---|---|---|---|---|
| 6,179,309 B1 * | 1/2001 | Satou | ....................... | B60G 3/20 |
| | | | | 280/124.179 |
| 7,628,259 B2 | 12/2009 | Norgaard et al. | | |

| | | | | |
|---|---|---|---|---|
| 7,780,177 B2 * | 8/2010 | Michel | ............... | B60G 17/0157 |
| | | | | 280/124.146 |
| 8,616,563 B2 * | 12/2013 | Lee | .................... | B60G 17/0155 |
| | | | | 267/195 |
| 8,763,639 B2 | 7/2014 | Cook et al. | | |
| 9,193,241 B2 * | 11/2015 | Suchta | ................. | B60G 15/067 |
| 9,211,775 B1 * | 12/2015 | Ryshavy | ................. | F16F 1/121 |
| 9,586,645 B2 | 3/2017 | Becker et al. | | |
| 10,570,976 B1 * | 2/2020 | Evans | ....................... | F16F 1/13 |
| 11,352,029 B2 * | 6/2022 | Sterrett | ............. | B60G 17/0272 |

(Continued)

OTHER PUBLICATIONS

International Search Report and Written Opinion, PCT/US2025/
052552, mailed Jan. 12, 2026.

*Primary Examiner* — Laura Freedman

(74) *Attorney, Agent, or Firm* — Master Key IP, LLP;
Justin G. Sanders

(57) ABSTRACT

A vehicle lift spacer apparatus for a vehicle shock is dis-
closed and configured for increasing a height of a vehicle
without potentially over-extending or damaging the vehi-
cle's suspension. In at least one embodiment, a spacer body
provides a lift portion having a lift height and a preload
portion positioned below the lift portion and having a
preload height. During use, with a bottom surface of the
preload portion positioned in substantially abutting contact
with an upper surface of a coil spring of the vehicle shock,
the coil spring is preloaded relative to a shaft of a strut of the
vehicle shock and compressed by a distance equal to the
preload height of the preload portion, while an overall height
of the vehicle shock is increased by an amount equal to the
lift height of the lift portion and the preload height of the
preload portion.

20 Claims, 10 Drawing Sheets

(56) References Cited

U.S. PATENT DOCUMENTS

| | | | |
|---|---|---|---|
| 11,602,965 B2 * | 3/2023 | Kuribayashi | B60G 7/008 |
| 11,602,971 B2 | 3/2023 | Strickland et al. | |
| 11,879,517 B2 | 1/2024 | Shimauchi et al. | |
| 11,927,242 B2 | 3/2024 | Smith et al. | |
| 11,964,726 B2 * | 4/2024 | Kubotera | B60G 17/08 |
| 11,976,706 B2 | 5/2024 | Marking | |
| 2003/0189278 A1 | 10/2003 | Kawada et al. | |
| 2005/0225051 A1 | 10/2005 | Bennett | |
| 2008/0191440 A1 | 8/2008 | Ryshavy et al. | |
| 2013/0200578 A1 | 8/2013 | Kohlhauser et al. | |
| 2016/0121686 A1 | 5/2016 | Botello et al. | |
| 2019/0126709 A1 * | 5/2019 | Ash | B60G 11/14 |
| 2023/0109503 A1 | 4/2023 | Awano et al. | |
| 2023/0226869 A1 * | 7/2023 | Westcott | B62D 21/11 |
| | | | 248/578 |
| 2024/0003401 A1 | 1/2024 | Verstoep | |

* cited by examiner

VEHICLE LIFT SPACER APPARATUS

RELATED APPLICATIONS

This application claims priority and is entitled to the filing date of U.S. provisional application Ser. No. 63/713,692, filed on Oct. 30, 2024. The contents of the aforementioned application are incorporated herein by reference.

BACKGROUND

The subject of this patent application relates generally to vehicle lift systems, and more particularly to an improved vehicle lift spacer apparatus for a vehicle shock of a vehicle, configured for increasing a height of the vehicle by a desired lift height without potentially over-extending or damaging the vehicle's suspension.

Applicant hereby incorporates herein by reference any and all patents and published patent applications cited or referred to in this application.

By way of background, a traditional vehicle shock 300 includes a lower washer 302, a lower bushing 304, a support washer 306, an upper bushing 308, and an upper washer 310, which work together to mount the vehicle shock 300 securely to a vehicle chassis of a vehicle while isolating vibration and noise. A shaft 312 of a strut 314 of the vehicle shock 300 passes vertically through a center of these mounting components, serving as the structural axis around which they are arranged. At the bottom of the assembly, the lower washer 302 is positioned beneath the lower bushing 304 and fits snugly around the shaft 312, providing a flat, rigid surface that helps distribute the clamping force from the mounting hardware evenly across the lower bushing 304. The lower bushing 304, which is installed over the shaft 312 above the lower washer 302, is typically made of rubber or polyurethane and forms a cushioned interface between the shaft 312 and the vehicle's mounting bracket or frame, preventing metal-to-metal contact and dampening vibration. The support washer 306 is then placed over the shaft 312 and sits between the lower bushing 304 and upper bushing 308, maintaining proper spacing and alignment, and allowing each of the lower bushing 304 and upper bushing 308 to flex independently as the suspension moves while keeping the shaft 312 centered within the mount. Above this, the upper bushing 308 slides onto the shaft 312 and mirrors the lower bushing's 304 role, absorbing motion and vibration from the top side of the mount and further isolating the vehicle shock 300 from the vehicle chassis. Finally, the upper washer 310 is placed over the shaft 312 on top of the upper bushing 308 and provides a firm surface for a retaining nut 316, which threads onto a terminal end of the shaft 312. When tightened, the retaining nut 316 compresses the washers 302 and 310 and bushings 304 and 308 slightly, securing the vehicle shock 300 in place while still allowing the shaft 312 to move axially as the suspension operates. In this arrangement, the shaft 312 remains centered and properly supported, while the combination of washers 302 and 310 and bushings 304 and 308 ensures controlled flexibility, vibration damping, and quiet operation.

Vehicle lift spacers are designed as a cost-effective additional component for increasing the height of a vehicle by approximately 2-3 inches without needing to replace any existing components of the vehicle's suspension. As illustrated in FIGS. 1-3, known prior art lift spacers 200 are traditionally configured for being positioned between the vehicle chassis and an upper surface 318 of a coil spring 320 of the vehicle shock 300, such that a top surface 202 of the prior art lift spacer 200 is in substantially abutting contact with the 20) vehicle chassis and an opposing bottom surface 204 of the prior art lift spacer 200 is in substantially abutting contact with the upper surface 318 of the coil spring 320 (with the support washer 306 in substantially the same plane as the upper surface 318 of the coil spring 320), thereby spacing the upper surface 318 of the coil spring 320 a distance apart from the vehicle chassis while also increasing an overall shock height 208 of the vehicle shock 300 by virtue of an added prior art spacer height 206 of the prior art lift spacer 200. In other words, such prior art lift spacers 200 yield lift by simply spacing the upper surface 318 of the coil spring 320 from the vehicle chassis based on the prior art spacer height 206 of the prior art lift spacer 200, while also increasing the overall shock height 208 of the vehicle shock 300 by that same amount—i.e., overall shock height 208=shock height 324+prior art spacer height 206.

However, because the support washer 306 is positioned in substantially the same plane as the upper surface 318 of the coil spring 320, such a prior art lift spacer 200 design also increases the overall compressed length of the vehicle shock 300. This can cause an over-extension of the vehicle's suspension which, in turn, can damage various components of the vehicle, such as the upper and lower ball joints, inner and outer steering components, front axle assemblies, etc. The increased compressed length of the vehicle shock 300 can also allow the vehicle's suspension to coil bind the coil spring 320 and fully compress the vehicle shock 300 prematurely, causing damage to a strut 314, coil spring 320 and/or mounts 326 of the vehicle shock 300. Thus, there remains a need for an improved lift spacer that does not suffer from the above-noted problems. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing an improved vehicle lift spacer apparatus configured for increasing a height of a vehicle by a desired lift height without potentially over-extending or damaging the vehicle's suspension. In at least one embodiment, a spacer body provides a lift portion defining a substantially centrally positioned lift cavity therewithin, and a preload portion positioned below the lift portion, the preload portion defining a substantially centrally positioned preload cavity therewithin. A body divider is positioned within the spacer body so as to separate the lift cavity and the preload cavity, such that the lift cavity extends between the lift aperture and an upper surface of the body divider, while the preload cavity extends between the preload aperture and an opposing lower surface of the body divider. The lift cavity is sized and configured for supporting therewithin an upper bushing of the vehicle shock in abutting contact with the upper surface of the body divider, along with an upper washer of the vehicle shock positioned in abutting contact with an upper surface of the upper bushing. The preload cavity is sized and configured for supporting therewithin a lower bushing of the vehicle shock in abutting contact with the lower surface of the body divider, along with a lower washer of the vehicle shock positioned in abutting contact with a lower surface of the lower bushing. A top surface of the lift portion is configured for being in substantially abutting contact with a vehicle chassis of the vehicle, the top surface providing a lift aperture in fluid communication with the lift cavity and configured for receiving a shaft of a strut of the vehicle shock therethrough, the lift aperture further in substantial coaxial alignment with each of the upper washer and upper bushing. A bottom surface of the preload portion is configured for being in substantially abutting contact with an upper surface of a coil spring of the vehicle shock, the bottom surface providing a preload aperture in fluid communication with the preload cavity and configured for receiving the shaft of the strut of the vehicle shock therethrough, the preload aperture further in substantial coaxial alignment with each of the lower washer and lower bushing. The body divider provides a divider aperture extending through the body divider so as to create a fluid communication between the lift cavity and the preload cavity, the divider aperture configured for receiving the shaft of the strut of the vehicle shock therethrough. The lift portion has a lift height as measured from the top surface of the lift portion to the upper surface of the body divider. The preload portion has a preload height as measured from the lower surface of the body divider to the bottom surface of the preload portion, such that the body divider is positioned above the upper surface of the coil spring by a distance equal to the preload height. During use, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Turning now to FIGS. 4-12, there is shown an exemplary embodiment of an improved vehicle lift spacer apparatus 20 for a vehicle shock 300 of a vehicle, configured for increasing a height of a vehicle by a desired height without potentially over-extending or damaging a suspension of the vehicle. At the outset, it should be noted that while certain types of vehicle shocks 300 might be shown for illustrative purposes, the apparatus 20 may be configured for being utilized in connection with vehicle shocks 300 having any other sizes, shapes, dimensions and/or configurations, now known or later developed. Thus, in further embodiments, the various components of the apparatus 20 shown and described herein may take on any other sizes, shapes, dimensions, configurations, quantities and/or relative positions, now known or later developed, so long as the apparatus 20 is capable of substantially carrying out the functionality described herein.

Figure 1:
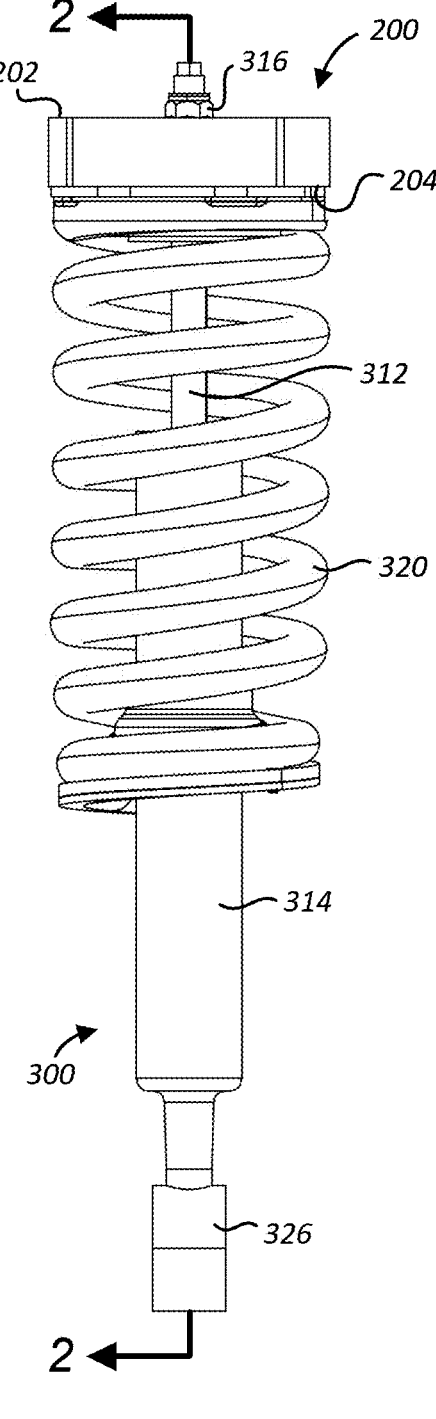
FIG. 1 is an elevational view of an exemplary prior art vehicle lift spacer positioned on an exemplary vehicle shock.
Figure 2:
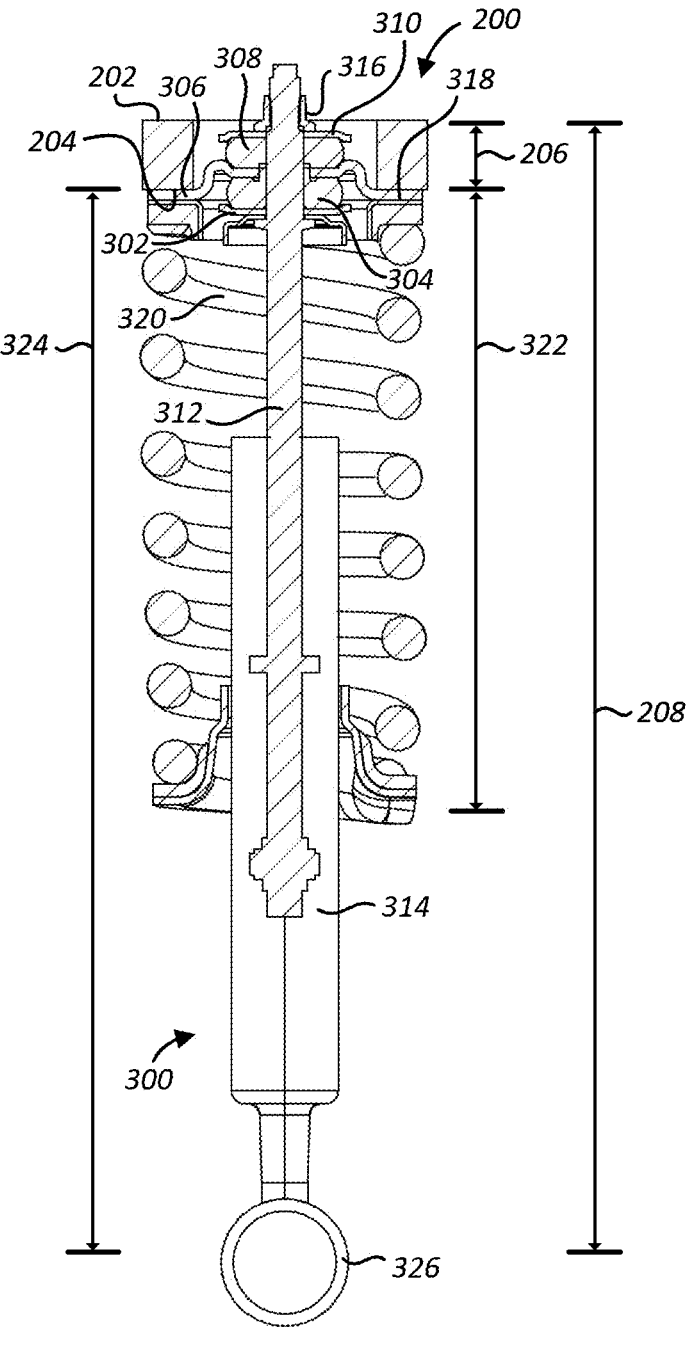
FIG. 2 is a cross-sectional view taken along line 2-2 of FIG. 1, though with a portion of the exemplary vehicle shock shown not in cross-section for clarity purposes.
Figure 3:
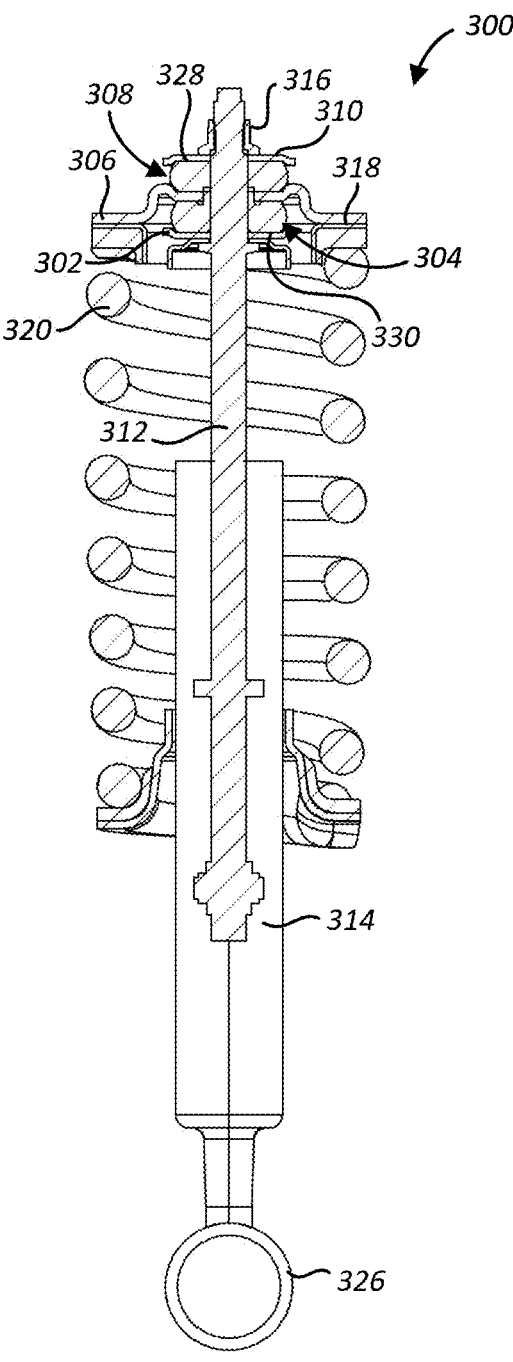
FIG. 3 is a further cross-sectional view taken along line 2-2 of FIG. 1, though with a portion of the exemplary vehicle shock shown not in cross-section for clarity purposes, with the exemplary prior art vehicle lift spacer omitted for clarity purposes.
Figure 4:
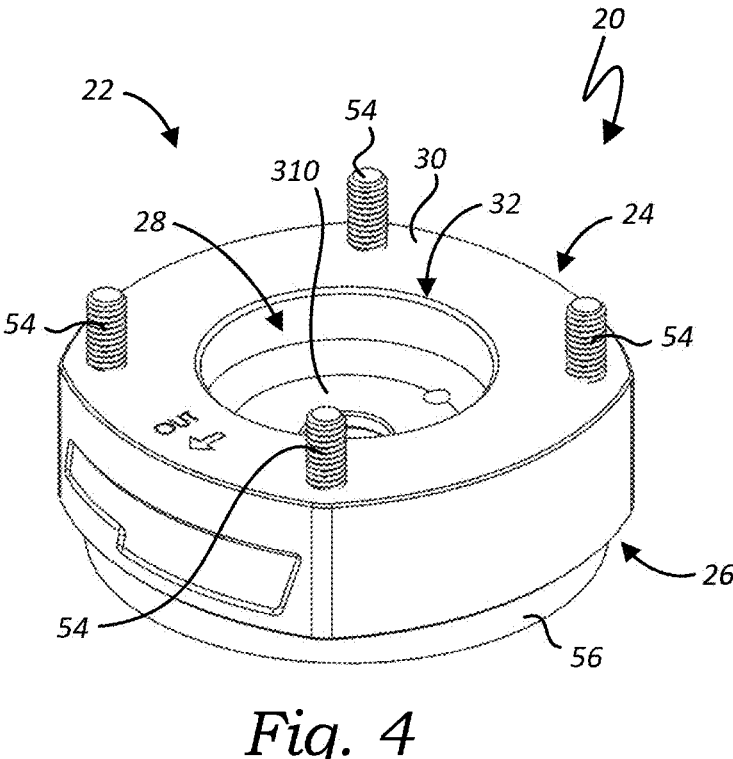
FIGS. 4 and 5 are perspective views of an exemplary vehicle lift spacer apparatus, in accordance with at least one embodiment.
Figure 5:
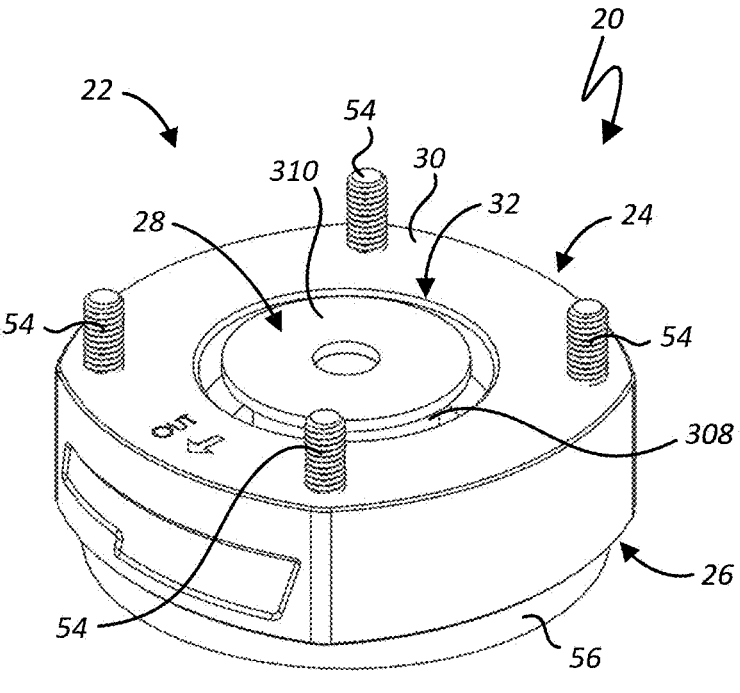
Figure 6:
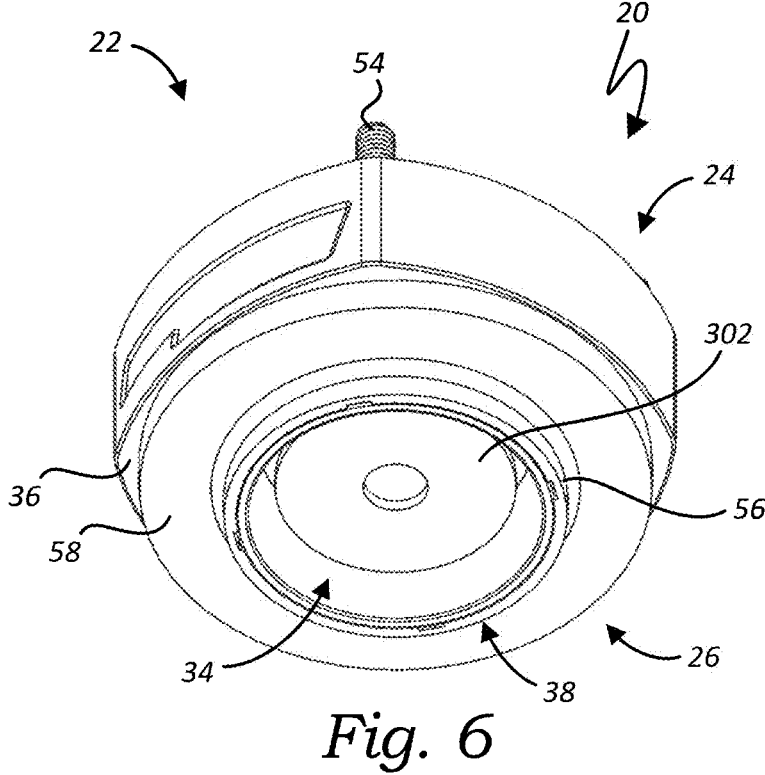
FIGS. 6 and 7 are further perspective views of the apparatus, in accordance with at least one embodiment.
Figure 7:
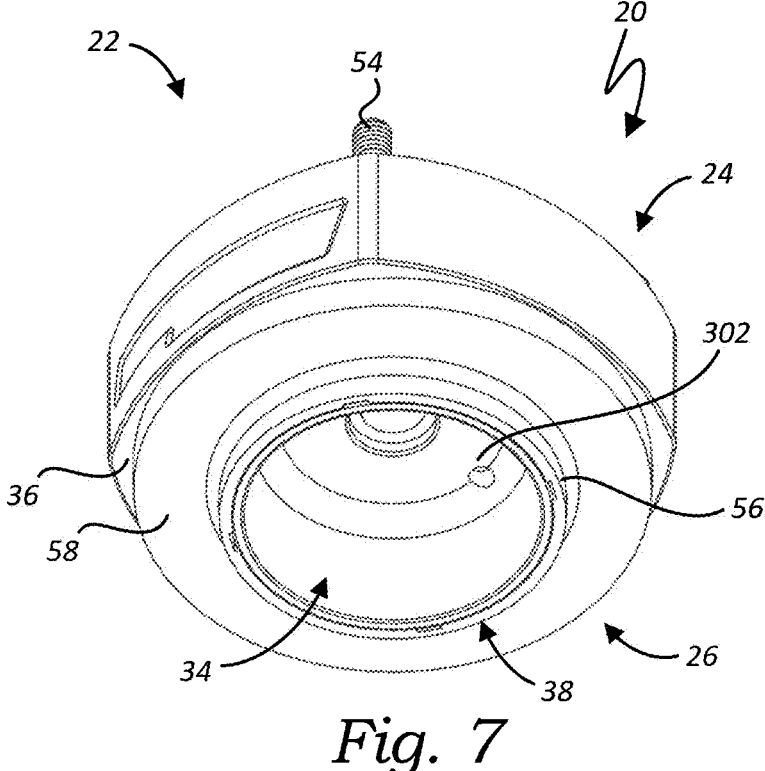
Figure 8:
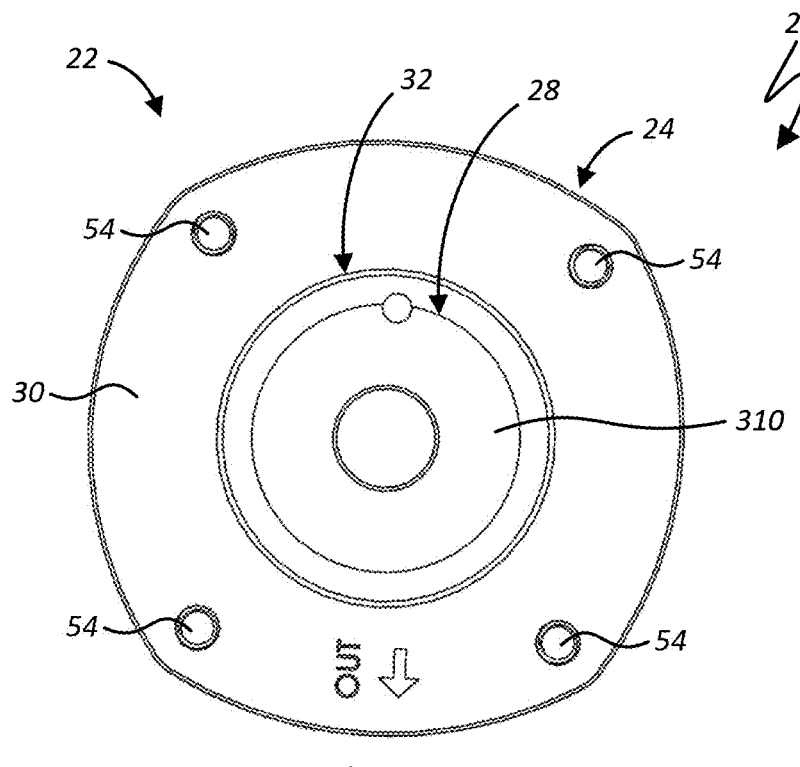
FIG. 8 is a top plan view of the apparatus, in accordance with at least one embodiment.
Figure 9:
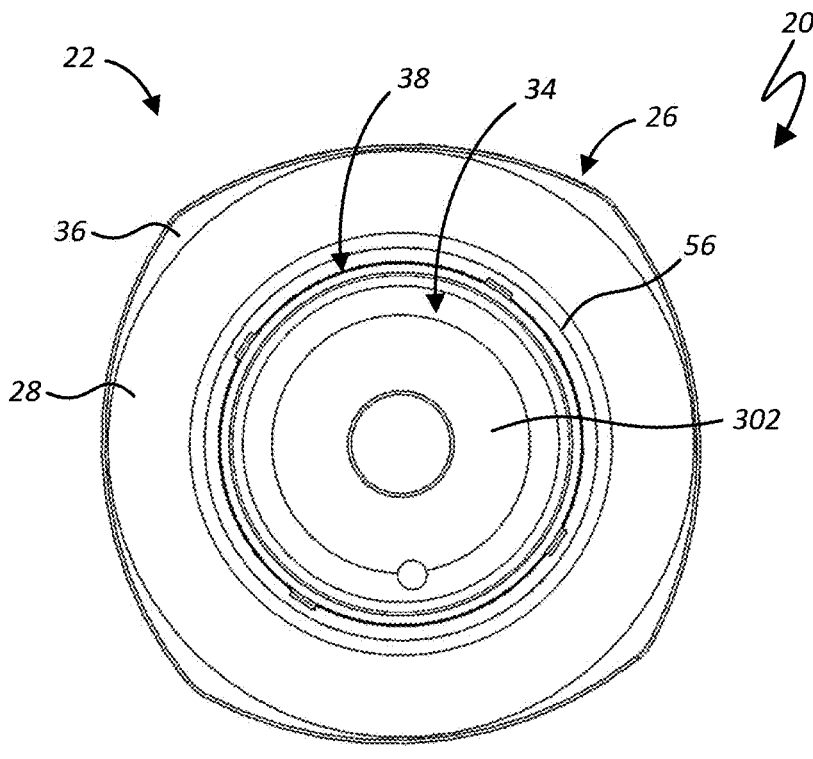
FIG. 9 is a bottom plan view of the apparatus, in accordance with at least one embodiment.
Figure 10:
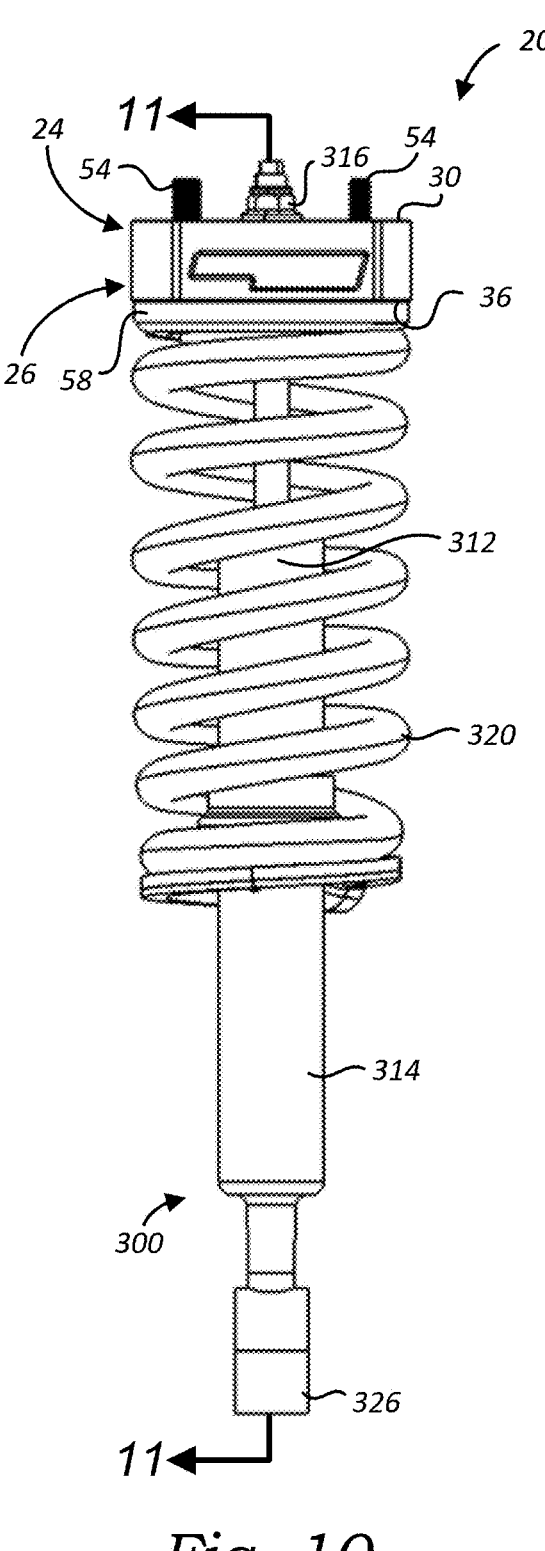
FIG. 10 is an elevational view of the apparatus positioned on an exemplary vehicle shock.
Figure 11:
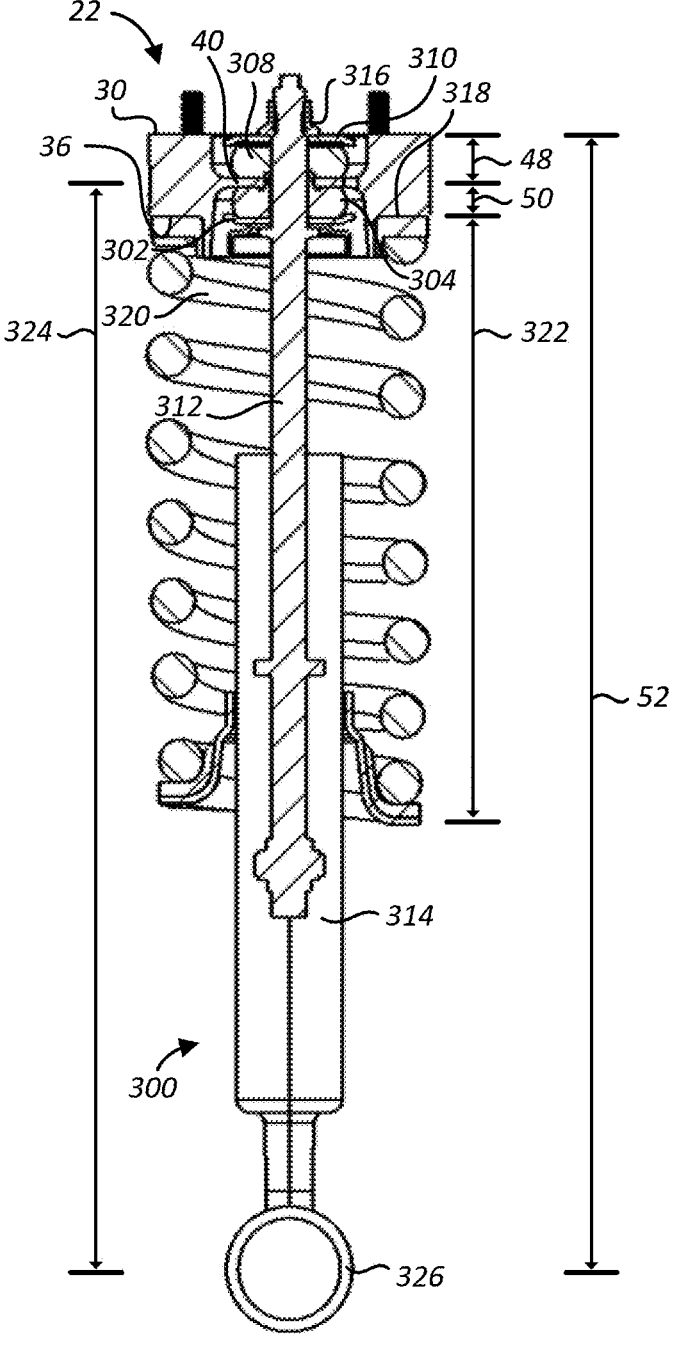
FIG. 11 is a cross-sectional view taken along line 11-11 of FIG. 10, though with a portion of the exemplary vehicle shock shown not in cross-section for clarity purposes.
Figure 12:
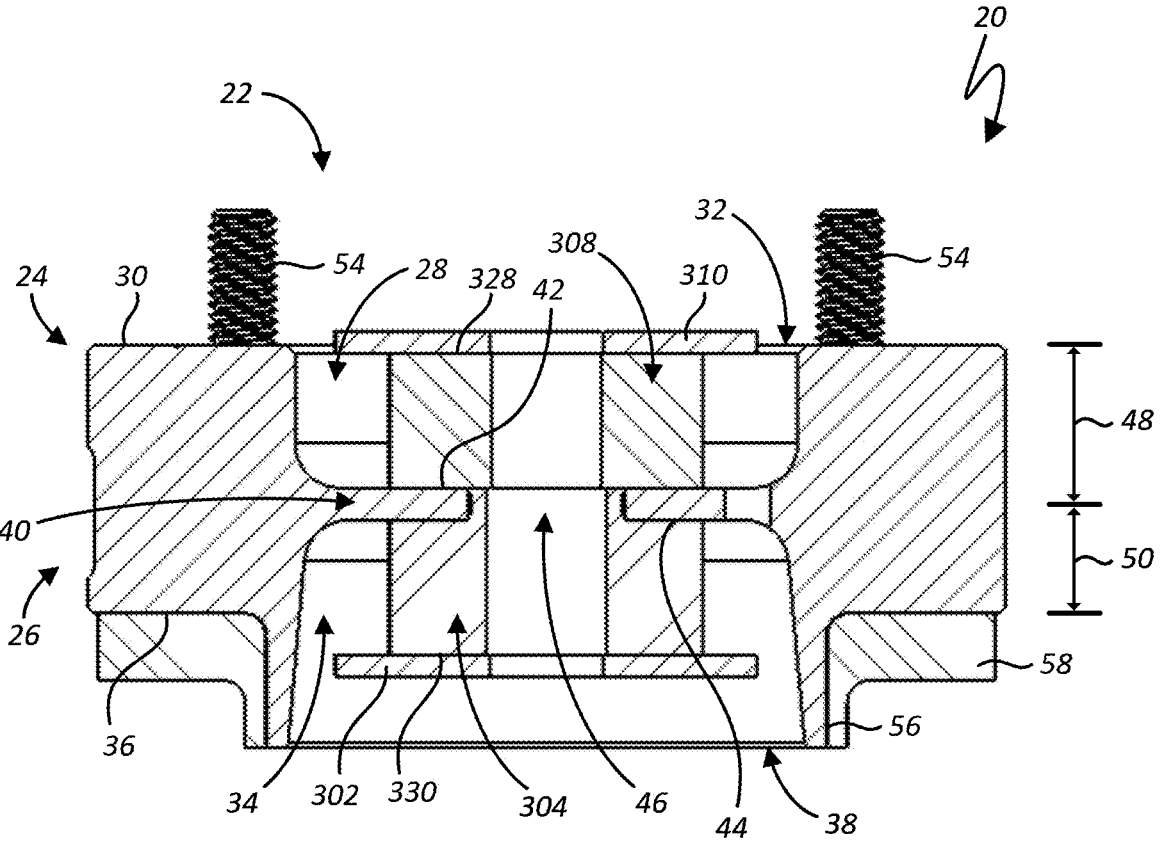
FIG. 12 is a further cross-sectional view taken along line 11-11 of FIG. 10, with the exemplary vehicle shock omitted for clarity purposes.

In at least one embodiment, the apparatus 20 provides a spacer body 22 having an upper lift portion 24 and a lower preload portion 26 positioned below the lift portion 24. In at least one embodiment, the lift portion 24 and the preload portion 26 are integral with one another, such that the lift portion 24 and the preload portion 26 are formed as a unitary piece. In at least one alternate embodiment, the lift portion 24 and the preload portion 26 are engaged (removably or permanently) with one another. In at least one embodiment, the spacer body 22 is constructed out of aluminum; however, in further embodiments, the spacer body 22 may be constructed out of any other material (or combination of material), now known or later developed, so long as the apparatus 20 is capable of substantially carrying out the functionality described herein. In at least one embodiment, the lift portion 24 defines a substantially centrally positioned lift cavity 28 therewithin, while a top surface 30 of the lift portion 24 provides a lift aperture 32 in fluid communication with the lift cavity 28. Additionally, in at least one embodiment, the preload portion 26 defines a substantially centrally positioned preload cavity 34 therewithin, while a bottom surface 36 of the preload portion 26 provides a preload aperture 38 in fluid communication with the preload cavity 34. In at least one embodiment, as best illustrated in FIG. 12, the lift cavity 28 is substantially axially aligned with the preload cavity 34.

Additionally, in at least one embodiment, the lift aperture 32 is substantially axially aligned with the preload aperture 38.

In at least one embodiment, the lift cavity 28 and preload cavity 34 are separated by a body divider 40 positioned within the spacer body 22, such that the lift cavity 28 extends between the lift aperture 32 and an upper surface 42 of the body divider 40, while the preload cavity 34 extends between the preload aperture 38 and an opposing lower surface 44 of the body divider 40. In at least one embodiment, the body divider 40 provides a substantially centrally positioned divider aperture 46 that extends through the body divider 40 and creates a fluid communication between the lift cavity 28 and the preload cavity 34. In at least one embodiment, the divider aperture 46 is substantially coaxially aligned with each of the lift aperture 32 and preload aperture 38, such that a shaft 312 of a strut 314 of the vehicle shock 300 is capable of extending through each of the preload aperture 38, divider aperture 46 and lift aperture 32, as illustrated best in FIG. 11. In other words, the body divider 40 is positioned and configured for replacing and functioning as a traditional support washer 306. Thus, in at least one embodiment, as best illustrated in FIG. 12, the lift cavity 28 is sized and configured for supporting therewithin an upper bushing 308 in abutting contact with the upper surface 42 of the body divider 40, along with an upper washer 310 positioned in abutting contact with an upper surface 328 of the upper bushing 308. Additionally, in at least one embodiment, the preload cavity 34 is sized and configured for supporting therewithin a lower bushing 304 in abutting contact with the lower surface 44 of the body divider 40, along with a lower washer 302 positioned in abutting contact with a lower surface 330 of the lower bushing 304. In at least one embodiment, each of the upper bushing 308 and lower bushing 304 is constructed out of a compressible, resilient material, such as rubber for example—however, in further embodiments, each of the upper bushing 308 and lower bushing 304 may be constructed out of any other material (or combination of materials), now known or later developed, so long as the upper bushing 308 and lower bushing 304 are capable of substantially carrying out the functionality described herein. Accordingly, when the apparatus 20 is engaged with the vehicle shock 300, the shaft 312 of the strut 314 of the vehicle shock 300 extends through each of the preload aperture 38, lower washer 302, lower bushing 304, divider aperture 46, upper bushing 308, upper washer 310 and lift aperture 32; thus, extending through the entire spacer body 22.

In at least one embodiment, as best illustrated in FIGS. 4-7, the compressible, resilient properties of the upper bushing 308 and lower bushing 304 allow the upper washer 310 and lower washer 302 (along with the shaft 312 of the strut 314 of the vehicle shock 300) to travel a distance vertically relative to the body divider 40 of the spacer body 22. In at least one embodiment, the shaft 312 of the strut 314 of the vehicle shock 300 is capable of articulating and vertically travelling between a lower shaft 312 position (FIGS. 4 and 6)—wherein the upper bushing 308 is compressed, such that the lower washer 302 is positioned in substantially the same plane as the bottom surface 36 of the preload portion 26 and the upper washer 310 is positioned substantially below the plane of the top surface 30 of the lift portion 24—and an upper shaft 312 position (FIGS. 5 and 7)—wherein the lower bushing 304 is compressed, such that the upper washer 310 is positioned in substantially the same plane as the top surface 30 of the lift portion 24 and the lower washer 302 is positioned substantially above the plane of the bottom surface 36 of the preload portion 26.

In at least one embodiment, as illustrated best in FIG. 12, the lift portion 24 has a lift height 48 (as measured from the top surface 30 of the lift portion 24 to the upper surface 42 of the body divider 40), while the preload portion 26 has a preload height 50 (as measured from the lower surface 44 of the body divider 40 to the bottom surface 36 of the preload portion 26). In at least one embodiment, the spacer body 22 is configured for being positioned between a vehicle chassis of the vehicle and an upper surface 318 of a coil spring 320 of the vehicle shock 300, such that the top surface 30 of the lift portion 24 is in substantially abutting contact with the vehicle chassis and the bottom surface 36 of the preload portion 26 is in substantially abutting contact with the upper surface 318 of the coil spring 320, thereby spacing the upper surface 318 of the coil spring 320 a distance apart from the vehicle chassis while also increasing an overall shock height 52 of the vehicle shock 300 by virtue of the added lift height 48 of the lift portion 24, as discussed further below. In at least one embodiment, the top surface 30 of the lift portion 24 provides an at least one mounting fastener 54 (such as a threaded shaft 312, for example) configured for engagement with the vehicle chassis of the vehicle. In at least one alternate embodiment, the spacer body 22 is permanently engaged or otherwise integral with one or both of the vehicle chassis and the upper surface 318 of the coil spring 320 of the vehicle shock 300.

In at least one embodiment, the bottom surface 36 of the preload portion 26 provides a preload wall 56 positioned about a circumference of the preload aperture 38 and extending downwardly from the bottom surface 36 of the preload portion 26. Accordingly, when the apparatus 20 is engaged with the vehicle shock 300, the preload wall 56 is substantially coaxially positioned within a circumference of the coil spring 320 of the vehicle shock 300. Additionally, in at least one embodiment, the bottom surface 36 of the preload portion 26 provides a spacer isolator 58 positioned between the bottom surface 36 of the preload portion 26 and the upper surface 318 of the coil spring 320 of the vehicle shock 300 so as to isolate and reduce the transmission of vibrational forces therebetween. In at least one such embodiment, the spacer isolator 58 is configured such that the preload wall 56 is substantially coaxially positioned within a circumference of the spacer isolator 58. In at least one embodiment, the spacer isolator 58 is constructed out of a compressible, resilient material, such as rubber for example—however, in further embodiments, the spacer isolator 58 may be constructed out of any other material (or combination of materials), now known or later developed, so long as the spacer isolator 58 is capable of substantially carrying out the functionality described herein.

Figure 13:
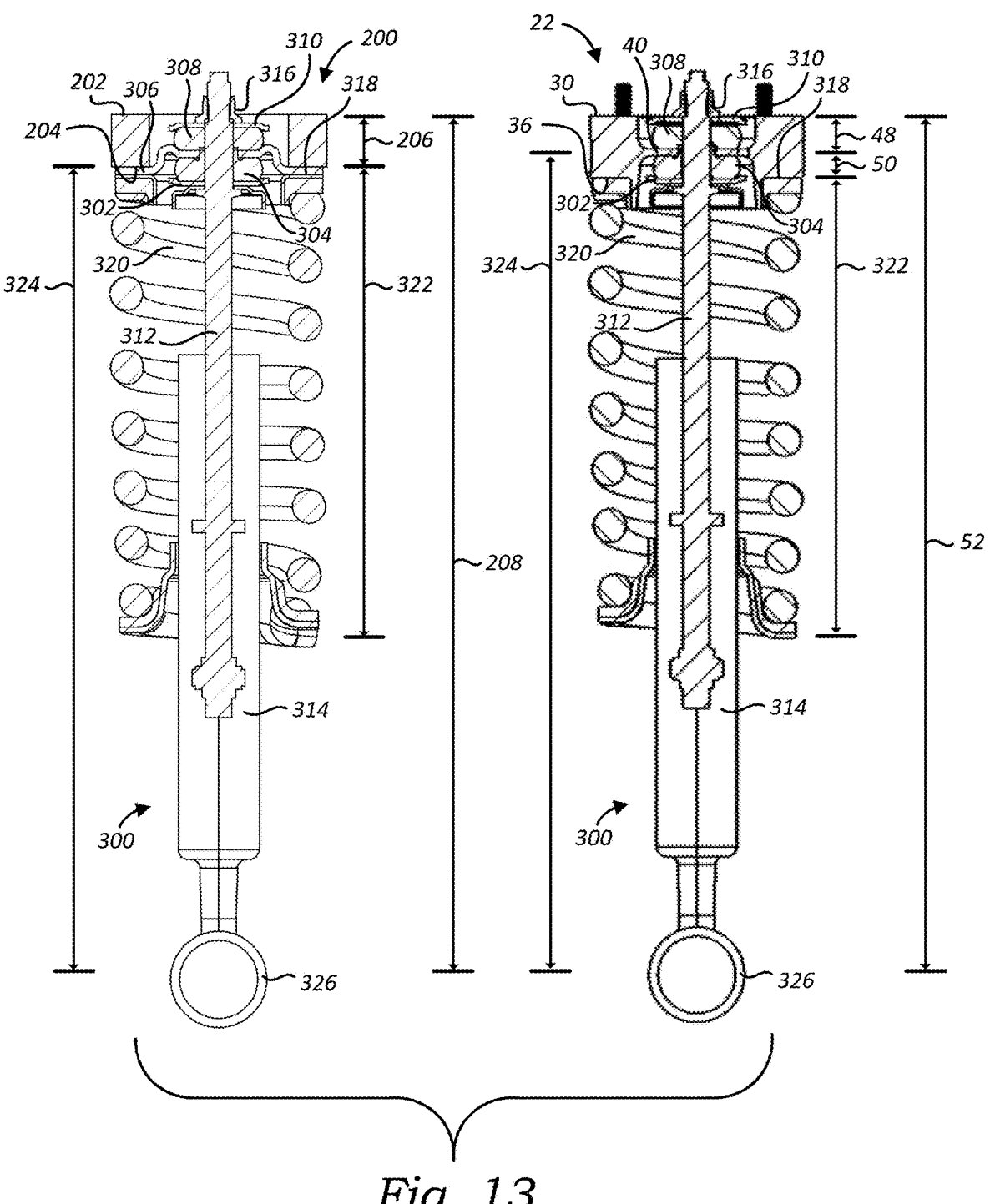
FIG. 13 is a side-by-side comparison of the cross-sectional views of FIGS. 2 and 11.

As discussed above, and as further illustrated in FIG. 13, known prior art lift spacers 200 yield lift by simply spacing the upper surface 318 of the coil spring 320 from the vehicle chassis based on the prior art spacer height 206 of the prior art lift spacer 200 which, in turn, increases the overall shock height 208 of the vehicle shock 300 by that same amount—i.e., overall shock height 208=shock height 324+prior art spacer height 206. In other words, the bottom surface 204 of the prior art lift spacer 200, along with the support washer 306, is in substantially the same plane as the upper surface 318 of the coil spring 320. By comparison, in at least one embodiment, when the apparatus 20 is engaged with the vehicle shock 300, the bottom surface 36 of the preload portion 26 (rather than the lift portion 24) is in substantially the same plane as the upper surface 318 of the coil spring

320, while the body divider 40 is positioned above the upper surface 318 of the coil spring 320 by a distance equal to the preload height 50; thereby preloading the coil spring 320 relative to the shaft 312 of the strut 314 by a distance equal to the preload height 50 of the preload portion 26. In other words, the preload portion 26 compresses (i.e., preloads) the coil spring 320 and decreases a spring height 322 of the coil spring 320 by a distance equal to the preload height 50 of the preload portion 26.

Accordingly, and by way of non-limiting example, because the body divider 40 is positioned above the bottom surface 36 of the preload portion 26 (and, in turn, the upper surface 318 of the coil spring 320) by a distance equal to the preload height 50, where a lift amount of X inches is desired, a portion of that lift amount is achieved by the lift height 48 of the lift portion 24, while the remaining portion of that lift amount is achieved by the preload height 50 of the preload portion 26—i.e., overall shock height 52=shock height 324+ lift height 48+preload height 50—with the spring height 322 of the coil spring 320 being preloaded by a distance equal to the preload height 50 of the preload portion 26.

Thus, for example, where the vehicle shock 300 has a shock height 324 of 10 inches and it is desired to have an overall shock height 208 of 13 inches with the coil spring 320 uncompressed, achieving that overall shock height 208 using a prior art lift spacer 200 would require a prior art spacer height 206 of 3 inches (i.e., 10 inches+3 inches=13 inches). By comparison, achieving that overall shock height 52 using the apparatus 20 would only require a lift height 48 of 1-1.5 inches, with the remaining portion of the overall shock height 52 being attributed to a preload height 50 of 1-1.5 inches (e.g., 10 inches+1.5 inches+1.5 inches=13 inches), such that the vehicle shock 300 attains the desired overall shock height 52 with the coil spring 320 already being preloaded by a distance equal to the preload height 50. As a result, the desired lift amount is achieved without increasing the overall shock height 52 of the vehicle shock 300 to the point of over-extending the vehicle's suspension or causing the suspension to coil bind the coil spring 320.

Aspects of the present specification may also be described as the following embodiments:

1. A vehicle lift spacer apparatus for a vehicle shock of a vehicle, the apparatus comprising: a spacer body comprising: a lift portion defining a substantially centrally positioned lift cavity therewithin; a preload portion positioned below the lift portion, the preload portion defining a substantially centrally positioned preload cavity therewithin; a body divider positioned within the spacer body so as to separate the lift cavity and the preload cavity, such that the lift cavity extends between the lift aperture and an upper surface of the body divider, while the preload cavity extends between the preload aperture and an opposing lower surface of the body divider; the lift cavity sized and configured for supporting therewithin an upper bushing of the vehicle shock in abutting contact with the upper surface of the body divider, along with an upper washer of the vehicle shock positioned in abutting contact with an upper surface of the upper bushing; the preload cavity sized and configured for supporting therewithin a lower bushing of the vehicle shock in abutting contact with the lower surface of the body divider, along with a lower washer of the vehicle shock positioned in abutting contact with a lower surface of the lower bushing; a top surface of the lift portion configured for being in substantially abutting contact with a vehicle chassis of the vehicle, the top surface providing a lift aperture in fluid communication with the lift cavity and configured for receiving a shaft of a strut of the vehicle shock therethrough, the lift aperture further in substantial coaxial alignment with each of the upper washer and upper bushing; a bottom surface of the preload portion configured for being in substantially abutting contact with an upper surface of a coil spring of the vehicle shock, the bottom surface providing a preload aperture in fluid communication with the preload cavity and configured for receiving the shaft of the strut of the vehicle shock therethrough, the preload aperture further in substantial coaxial alignment with each of the lower washer and lower bushing; the body divider providing a divider aperture extending through the body divider so as to create a fluid communication between the lift cavity and the preload cavity, the divider aperture configured for receiving the shaft of the strut of the vehicle shock therethrough; the lift portion having a lift height as measured from the top surface of the lift portion to the upper surface of the body divider; and the preload portion having a preload height as measured from the lower surface of the body divider to the bottom surface of the preload portion, such that the body divider is positioned above the upper surface of the coil spring by a distance equal to the preload height; whereby, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

2. The vehicle lift spacer apparatus according to embodiment 1, wherein the lift portion and the preload portion are integral with one another.

3. The vehicle lift spacer apparatus according to embodiments 1-2, wherein the lift portion and the preload portion are removably or permanently engaged with one another.

4. The vehicle lift spacer apparatus according to embodiments 1-3, wherein the spacer body is constructed out of aluminum.

5. The vehicle lift spacer apparatus according to embodiments 1-4, wherein the lift cavity is substantially axially aligned with the preload cavity.

6. The vehicle lift spacer apparatus according to embodiments 1-5, wherein the lift aperture is substantially axially aligned with the preload aperture.

7. The vehicle lift spacer apparatus according to embodiments 1-6, wherein the divider aperture is substantially coaxially aligned with each of the lift aperture and preload aperture.

8. The vehicle lift spacer apparatus according to embodiments 1-7, wherein each of the upper bushing and lower bushing is constructed out of a compressible, resilient material.

9. The vehicle lift spacer apparatus according to embodiments 1-8, wherein the top surface of the lift portion provides an at least one mounting fastener positioned and configured for securing the spacer body to the vehicle chassis of the vehicle.

10. The vehicle lift spacer apparatus according to embodiments 1-9, wherein the top surface of the lift portion is permanently engaged or otherwise integral with the vehicle chassis of the vehicle.

11. The vehicle lift spacer apparatus according to embodiments 1-10, wherein the bottom surface of the preload portion is permanently engaged or otherwise integral with the upper surface of the coil spring of the vehicle shock.

12. The vehicle lift spacer apparatus according to embodiments 1-11, wherein the bottom surface of the preload portion provides a preload wall positioned about a circumference of the preload aperture and extending downwardly from the bottom surface of the preload portion, the preload wall configured for being substantially coaxially positioned within a circumference of the coil spring of the vehicle shock.

13. The vehicle lift spacer apparatus according to embodiments 1-12, wherein the bottom surface of the preload portion provides a spacer isolator positioned between the bottom surface of the preload portion and the upper surface of the coil spring of the vehicle shock so as to isolate and reduce the transmission of vibrational forces therebetween.

14. The vehicle lift spacer apparatus according to embodiments 1-13, wherein the preload wall is substantially coaxially positioned within a circumference of the spacer isolator.

15. The vehicle lift spacer apparatus according to embodiments 1-14, wherein the spacer isolator is constructed out of a compressible, resilient material.

16. A vehicle lift spacer apparatus for a vehicle shock of a vehicle, the apparatus comprising: a spacer body comprising: a lift portion defining a substantially centrally positioned lift cavity therewithin; a preload portion positioned below the lift portion, the preload portion defining a substantially centrally positioned preload cavity therewithin; a body divider positioned within the spacer body so as to separate the lift cavity and the preload cavity, such that the lift cavity extends between the lift aperture and an upper surface of the body divider, while the preload cavity extends between the preload aperture and an opposing lower surface of the body divider; the lift cavity sized and configured for supporting therewithin an upper bushing of the vehicle shock in abutting contact with the upper surface of the body divider, along with an upper washer of the vehicle shock positioned in abutting contact with an upper surface of the upper bushing; the preload cavity sized and configured for supporting therewithin a lower bushing of the vehicle shock in abutting contact with the lower surface of the body divider, along with a lower washer of the vehicle shock positioned in abutting contact with a lower surface of the lower bushing; a top surface of the lift portion configured for being in substantially abutting contact with a vehicle chassis of the vehicle, the top surface providing a lift aperture in fluid communication with the lift cavity and configured for receiving a shaft of a strut of the vehicle shock therethrough, the lift aperture further in substantial coaxial alignment with each of the upper washer and upper bushing; a bottom surface of the preload portion configured for being in substantially abutting contact with an upper surface of a coil spring of the vehicle shock, the bottom surface providing a preload aperture in fluid communication with the preload cavity and configured for receiving the shaft of the strut of the vehicle shock therethrough, the preload aperture further in substantial coaxial alignment with each of the lower washer, lower bushing and lift aperture; the body divider providing a divider aperture extending through the body divider so as to create a fluid communication between the lift cavity and the preload cavity, the divider aperture configured for receiving the shaft of the strut of the vehicle shock therethrough, the divider aperture further in substantial coaxial alignment with each of the lift aperture and preload aperture; the lift portion having a lift height as measured from the top surface of the lift portion to the upper surface of the body divider; and the preload portion having a preload height as measured from the lower surface of the body divider to the bottom surface of the preload portion, such that the body divider is positioned above the upper surface of the coil spring by a distance equal to the preload height; whereby, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

17. A combination vehicle shock and vehicle lift spacer apparatus comprising: a vehicle shock; and a spacer body comprising: a lift portion defining a substantially centrally positioned lift cavity therewithin; a preload portion positioned below the lift portion, the preload portion defining a substantially centrally positioned preload cavity therewithin; a body divider positioned within the spacer body so as to separate the lift cavity and the preload cavity, such that the lift cavity extends between the lift aperture and an upper surface of the body divider, while the preload cavity extends between the preload aperture and an opposing lower surface of the body divider; the lift cavity sized and configured for supporting therewithin an upper bushing of the vehicle shock in abutting contact with the upper surface of the body divider, along with an upper washer of the vehicle shock positioned in abutting contact with an upper surface of the upper bushing; the preload cavity sized and configured for supporting therewithin a lower bushing of the vehicle shock in abutting contact with the lower surface of the body divider, along with a lower washer of the vehicle shock positioned in abutting contact with a lower surface of the lower bushing; a top surface of the lift portion configured for being in substantially abutting contact with a vehicle chassis of a vehicle, the top surface providing a lift aperture in fluid communication with the lift cavity and configured for receiving a shaft of a strut of the vehicle shock therethrough, the lift aperture further in substantial coaxial alignment with each of the upper washer and upper bushing; a bottom surface of the preload portion configured for being in substantially abutting contact with an upper surface of a coil spring of the vehicle shock, the bottom surface providing a preload aperture in fluid communication with the preload cavity and configured for receiving the shaft of the strut of the vehicle shock therethrough, the preload aperture further in substantial coaxial alignment with each of the lower washer and lower bushing; the body divider providing a divider aperture extending through the body divider so as to create a fluid communication between the lift cavity and the preload cavity, the divider aperture configured for receiving the shaft of the strut of the vehicle shock therethrough; the lift portion having a lift height as measured from the top surface of the lift portion to the upper surface of the body divider; and the preload portion having a preload height as measured from the lower surface of the body divider to the bottom surface of the preload portion, such that the body divider is positioned above the upper surface of the coil spring by a distance equal to the preload height; whereby, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

18. The combination vehicle shock and vehicle lift spacer apparatus according to embodiment 17, wherein the lift portion and the preload portion are integral with one another.

19. The combination vehicle shock and vehicle lift spacer apparatus according to embodiments 17-18, wherein the lift portion and the preload portion are removably or permanently engaged with one another.

20. The combination vehicle shock and vehicle lift spacer apparatus according to embodiments 17-19, wherein the spacer body is constructed out of aluminum.

21. The combination vehicle shock and vehicle lift spacer apparatus according to embodiments 17-20, wherein the lift cavity is substantially axially aligned with the preload cavity.

22. The combination vehicle shock and vehicle lift spacer apparatus according to embodiments 17-21, wherein the lift aperture is substantially axially aligned with the preload aperture.

23. The combination vehicle shock and vehicle lift spacer apparatus according to embodiments 17-22, wherein the divider aperture is substantially coaxially aligned with each of the lift aperture and preload aperture.

24. The combination vehicle shock and vehicle lift spacer apparatus according to embodiments 17-23, wherein each of the upper bushing and lower bushing is constructed out of a compressible, resilient material.

25. The combination vehicle shock and vehicle lift spacer apparatus according to embodiments 17-24, wherein the top surface of the lift portion provides an at least one mounting fastener positioned and configured for securing the spacer body to the vehicle chassis of the vehicle.

26. The combination vehicle shock and vehicle lift spacer apparatus according to embodiments 17-25, wherein the top surface of the lift portion is permanently engaged or otherwise integral with the vehicle chassis of the vehicle.

27. The combination vehicle shock and vehicle lift spacer apparatus according to embodiments 17-26, wherein the bottom surface of the preload portion is permanently engaged or otherwise integral with the upper surface of the coil spring of the vehicle shock.

28. The combination vehicle shock and vehicle lift spacer apparatus according to embodiments 17-27, wherein the bottom surface of the preload portion provides a preload wall positioned about a circumference of the preload aperture and extending downwardly from the bottom surface of the preload portion, the preload wall configured for being substantially coaxially positioned within a circumference of the coil spring of the vehicle shock.

29. The combination vehicle shock and vehicle lift spacer apparatus according to embodiments 17-28, wherein the bottom surface of the preload portion provides a spacer isolator positioned between the bottom surface of the preload portion and the upper surface of the coil spring of the vehicle shock so as to isolate and reduce the transmission of vibrational forces therebetween.

30. The combination vehicle shock and vehicle lift spacer apparatus according to embodiments 17-29, wherein the preload wall is substantially coaxially positioned within a circumference of the spacer isolator.

31. The combination vehicle shock and vehicle lift spacer apparatus according to embodiments 17-30, wherein the spacer isolator is constructed out of a compressible, resilient material.

In closing, regarding the exemplary embodiments of the present invention as shown and described herein, it will be appreciated that an improved vehicle lift spacer apparatus for a vehicle shock of a vehicle is disclosed and configured for increasing a height of the vehicle by a desired lift height without potentially over-extending or damaging the vehicle's suspension. Because the principles of the invention may be practiced in a number of configurations beyond those shown and described, it is to be understood that the invention is not in any way limited by the exemplary embodiments, but is generally directed to a vehicle lift spacer apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators-such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112 (f) will begin with the words "means for," but use of the term "for" in any other context is not intended to invoke treatment under 35 U.S.C. § 112 (f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the 10 filing date of the present application. Nothing in this regard should be construed as an admission that the inventors are not entitled to antedate such disclosure by virtue of prior invention or for any other reason. All statements as to the date or representation as to the contents of these documents are based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

All of the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A vehicle lift spacer apparatus for a vehicle shock of a vehicle, the apparatus comprising:
   a spacer body comprising:
      a lift portion defining a substantially centrally positioned lift cavity therewithin;
      a top surface of the lift portion configured for being in substantially abutting contact with a vehicle chassis of the vehicle, the top surface providing a lift aperture in fluid communication with the lift cavity and configured for receiving a shaft of a strut of the vehicle shock therethrough;
      a preload portion positioned below the lift portion, the preload portion defining a substantially centrally positioned preload cavity therewithin;
      a bottom surface of the preload portion configured for being in substantially abutting contact with an upper surface of a coil spring of the vehicle shock, the bottom surface providing a preload aperture in fluid communication with the preload cavity and configured for receiving the shaft of the strut of the vehicle shock therethrough;
      a body divider positioned within the spacer body so as to separate the lift cavity and the preload cavity, such that the lift cavity extends between the lift aperture and an upper surface of the body divider, while the preload cavity extends between the preload aperture and an opposing lower surface of the body divider;
      the lift cavity sized and configured for supporting therewithin an upper bushing of the vehicle shock in abutting contact with the upper surface of the body divider, along with an upper washer of the vehicle shock positioned in abutting contact with an upper surface of the upper bushing, each of the upper washer and upper bushing in substantial coaxial alignment with the lift aperture;
      the preload cavity sized and configured for supporting therewithin a lower bushing of the vehicle shock in abutting contact with the lower surface of the body divider, along with a lower washer of the vehicle shock positioned in abutting contact with a lower surface of the lower bushing, each of the lower washer and lower bushing in substantial coaxial alignment with the preload aperture;
      the body divider providing a divider aperture extending through the body divider so as to create a fluid communication between the lift cavity and the preload cavity, the divider aperture configured for receiving the shaft of the strut of the vehicle shock therethrough;

the lift portion having a lift height as measured from the top surface of the lift portion to the upper surface of the body divider; and
      the preload portion having a preload height as measured from the lower surface of the body divider to the bottom surface of the preload portion, such that the body divider is positioned above the upper surface of the coil spring by a distance equal to the preload height;
      whereby, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

2. The vehicle lift spacer apparatus of claim 1, wherein the lift portion and the preload portion are integral with one another.

3. The vehicle lift spacer apparatus of claim 1, wherein the lift portion and the preload portion are removably or permanently engaged with one another.

4. The vehicle lift spacer apparatus of claim 1, wherein the lift cavity is substantially axially aligned with the preload cavity.

5. The vehicle lift spacer apparatus of claim 1, wherein the lift aperture is substantially axially aligned with the preload aperture.

6. The vehicle lift spacer apparatus of claim 1, wherein the divider aperture is substantially coaxially aligned with each of the lift aperture and preload aperture.

7. The vehicle lift spacer apparatus of claim 1, wherein the top surface of the lift portion provides an at least one mounting fastener positioned and configured for securing the spacer body to the vehicle chassis of the vehicle.

8. The vehicle lift spacer apparatus of claim 1, wherein the top surface of the lift portion is permanently engaged or otherwise integral with the vehicle chassis of the vehicle.

9. The vehicle lift spacer apparatus of claim 1, wherein the bottom surface of the preload portion is permanently engaged or otherwise integral with the upper surface of the coil spring of the vehicle shock.

10. The vehicle lift spacer apparatus of claim 1, wherein the bottom surface of the preload portion provides a preload wall positioned about a circumference of the preload aperture and extending downwardly from the bottom surface of the preload portion, the preload wall configured for being substantially coaxially positioned within a circumference of the coil spring of the vehicle shock.

11. The vehicle lift spacer apparatus of claim 10, wherein the bottom surface of the preload portion provides a spacer isolator positioned between the bottom surface of the preload portion and the upper surface of the coil spring of the vehicle shock so as to isolate and reduce the transmission of vibrational forces therebetween.

12. The vehicle lift spacer apparatus of claim 11, wherein the preload wall is substantially coaxially positioned within a circumference of the spacer isolator.

13. A vehicle lift spacer apparatus for a vehicle shock of a vehicle, the apparatus comprising:

a spacer body comprising:

a lift portion defining a substantially centrally positioned lift cavity therewithin;

a top surface of the lift portion configured for being in substantially abutting contact with a vehicle chassis of the vehicle, the top surface providing a lift aperture in fluid communication with the lift cavity and configured for receiving a shaft of a strut of the vehicle shock therethrough;

a preload portion positioned below the lift portion, the preload portion defining a substantially centrally positioned preload cavity therewithin;

a bottom surface of the preload portion configured for being in substantially abutting contact with an upper surface of a coil spring of the vehicle shock, the bottom surface providing a preload aperture in fluid communication with the preload cavity and configured for receiving the shaft of the strut of the vehicle shock therethrough;

a body divider positioned within the spacer body so as to separate the lift cavity and the preload cavity, such that the lift cavity extends between the lift aperture and an upper surface of the body divider, while the preload cavity extends between the preload aperture and an opposing lower surface of the body divider;

the lift cavity sized and configured for supporting therewithin an upper bushing of the vehicle shock in abutting contact with the upper surface of the body divider, along with an upper washer of the vehicle shock positioned in abutting contact with an upper surface of the upper bushing, each of the upper washer and upper bushing in substantial coaxial alignment with the lift aperture;

the preload cavity sized and configured for supporting therewithin a lower bushing of the vehicle shock in abutting contact with the lower surface of the body divider, along with a lower washer of the vehicle shock positioned in abutting contact with a lower surface of the lower bushing, each of the lower washer and lower bushing in substantial coaxial alignment with the preload aperture;

the body divider providing a divider aperture extending through the body divider so as to create a fluid communication between the lift cavity and the preload cavity, the divider aperture configured for receiving the shaft of the strut of the vehicle shock therethrough, the divider aperture further in substantial coaxial alignment with each of the lift aperture and preload aperture;

the lift portion having a lift height as measured from the top surface of the lift portion to the upper surface of the body divider; and the preload portion having a preload height as measured from the lower surface of the body divider to the bottom surface of the preload portion, such that the body divider is positioned above the upper surface of the coil spring by a distance equal to the preload height;

whereby, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

14. A combination vehicle shock and vehicle lift spacer apparatus comprising:

a vehicle shock; and a spacer body comprising:

a lift portion defining a substantially centrally positioned lift cavity therewithin;

a top surface of the lift portion configured for being in substantially abutting contact with a vehicle chassis of the vehicle, the top surface providing a lift aperture in fluid communication with the lift cavity and configured for receiving a shaft of a strut of the vehicle shock therethrough;

a preload portion positioned below the lift portion, the preload portion defining a substantially centrally positioned preload cavity therewithin;

a bottom surface of the preload portion configured for being in substantially abutting contact with an upper surface of a coil spring of the vehicle shock, the bottom surface providing a preload aperture in fluid communication with the preload cavity and configured for receiving the shaft of the strut of the vehicle shock therethrough;

a body divider positioned within the spacer body so as to separate the lift cavity and the preload cavity, such that the lift cavity extends between the lift aperture and an upper surface of the body divider, while the preload cavity extends between the preload aperture and an opposing lower surface of the body divider;

the lift cavity sized and configured for supporting therewithin an upper bushing of the vehicle shock in abutting contact with the upper surface of the body divider, along with an upper washer of the vehicle shock positioned in abutting contact with an upper surface of the upper bushing, each of the upper washer and upper bushing in substantial coaxial alignment with the lift aperture;

the preload cavity sized and configured for supporting therewithin a lower bushing of the vehicle shock in abutting contact with the lower surface of the body divider, along with a lower washer of the vehicle shock positioned in abutting contact with a lower surface of the lower bushing, each of the lower washer and lower bushing in substantial coaxial alignment with the preload aperture;

the body divider providing a divider aperture extending through the body divider so as to create a fluid communication between the lift cavity and the preload cavity, the divider aperture configured for receiving the shaft of the strut of the vehicle shock therethrough;

the lift portion having a lift height as measured from the top surface of the lift portion to the upper surface of the body divider; and the preload portion having a preload height as measured from the lower surface of the body divider to the bottom surface of the preload portion, such that the body divider is positioned above the upper surface of the coil spring by a distance equal to the preload height;

whereby, with the top surface of the lift portion positioned in substantially abutting contact with the vehicle chassis of the vehicle and the bottom surface of the preload portion positioned in substantially abutting contact with the upper surface of the coil spring of the vehicle shock, the coil spring is preloaded relative to the shaft of the strut of the vehicle shock and compressed by a distance equal to the preload height of the preload portion, while an overall height of the vehicle shock is increased by an amount equal to the lift height of the lift portion and the preload height of the preload portion.

15. The combination vehicle shock and vehicle lift spacer apparatus of claim 14, wherein the lift cavity is substantially axially aligned with the preload cavity.

16. The combination vehicle shock and vehicle lift spacer apparatus of claim 14, wherein the lift aperture is substantially axially aligned with the preload aperture.

17. The combination vehicle shock and vehicle lift spacer apparatus of claim 14, wherein the divider aperture is substantially coaxially aligned with each of the lift aperture and preload aperture.

18. The combination vehicle shock and vehicle lift spacer apparatus of claim 14, wherein the bottom surface of the preload portion provides a preload wall positioned about a circumference of the preload aperture and extending downwardly from the bottom surface of the preload portion, the preload wall configured for being substantially coaxially positioned within a circumference of the coil spring of the vehicle shock.

19. The combination vehicle shock and vehicle lift spacer apparatus of claim 18, wherein the bottom surface of the preload portion provides a spacer isolator positioned between the bottom surface of the preload portion and the upper surface of the coil spring of the vehicle shock so as to isolate and reduce transmission of vibrational forces therebetween.

20. The combination vehicle shock and vehicle lift spacer apparatus of claim 19, wherein the preload wall is substantially coaxially positioned within a circumference of the spacer isolator.

* * * * *